United States Patent
Clemes

(10) Patent No.: US 12,252,418 B2
(45) Date of Patent: Mar. 18, 2025

(54) FATS, OIL AND GREASE COLLECTION

(71) Applicant: Eco Clarity Ltd., London (GB)

(72) Inventor: Christopher Charles Clemes, London (GB)

(73) Assignee: ECO CLARITY Ltd., London (GB)

( * ) Notice: Subject to any disclaimer, the term of this patent is extended or adjusted under 35 U.S.C. 154(b) by 294 days.

(21) Appl. No.: 17/425,913

(22) PCT Filed: Jan. 16, 2020

(86) PCT No.: PCT/IB2020/050334
§ 371 (c)(1),
(2) Date: Jul. 26, 2021

(87) PCT Pub. No.: WO2020/148695
PCT Pub. Date: Jul. 23, 2020

(65) Prior Publication Data
US 2023/0399243 A1    Dec. 14, 2023

(30) Foreign Application Priority Data
Jan. 16, 2019  (ZA) .................... 2018-04718

(51) Int. Cl.
| C02F 1/40 | (2023.01) |
| C02F 1/00 | (2023.01) |
| C02F 1/02 | (2023.01) |
| C02F 101/32 | (2006.01) |
| C02F 103/32 | (2006.01) |

(52) U.S. Cl.
CPC ............... *C02F 1/40* (2013.01); *C02F 1/001* (2013.01); *C02F 1/02* (2013.01); *C02F 2101/32* (2013.01); *C02F 2103/32* (2013.01)

(58) Field of Classification Search
CPC .... C02F 1/40; C02F 1/001; C02F 1/02; C02F 2101/32; C02F 2103/32
See application file for complete search history.

(56) References Cited

U.S. PATENT DOCUMENTS

| 3,726,406 A | 4/1973 | Damberger |
| 5,133,881 A | 7/1992 | Miller et al. |
| 7,828,960 B1 | 11/2010 | Batten et al. |

FOREIGN PATENT DOCUMENTS

| CN | 203283365 | 11/2013 | |
| CN | 204385008 U | 6/2015 | |
| CN | 104876345 | 9/2015 | |
| DE | 10026592 A1 * | 12/2001 | ........... B01D 17/005 |
| GB | 1 439 670 * | 6/1976 | ............. B01D 17/02 |
| GB | 1439 670 A | 6/1976 | |

OTHER PUBLICATIONS

DE 100 26 592 A1_English (Year: 2001).*

* cited by examiner

*Primary Examiner* — Youngsul Jeong
(74) *Attorney, Agent, or Firm* — Fish & Richardson P.C.

(57) ABSTRACT

A FOG (Fats, Oil and Grease) collector (100, 100') includes at least one floating member (110, 110') which is configured operatively to float in an effluent containing zone. The FOG collector has at least one heating arrangement (112) configured to warm effluent (150) in the effluent containing zone, thereby liquifying, at least partially, FOG (152) in the effluent. The FOG collector has collecting arrangement (114, 114') configured to draw in at least some of the warmed effluent including the liquified FOG out of the effluent containing zone for further treatment, processing and/or separation.

13 Claims, 11 Drawing Sheets

A-A

FATS, OIL AND GREASE COLLECTION

CROSS-REFERENCES TO RELATED APPLICATIONS

This application is a National Stage application under 35 U.S.C. § 371 of International Application No. PCT/IB2020/050334, filed Jan. 16, 2020, which claims the benefit of priority South Africa Application Serial No. 2018/04718, filed Jan. 16, 2019, all of which are incorporated by reference in their entireties herein.

FIELD OF INVENTION

The invention relates, generally, to the removal of food preparation contaminants from wastewater. More specifically, the invention relates to the collection and removal of wastewater fats, oil and grease, henceforth referred to as "FOG", from problematic areas in a wastewater network where FOG tends to collect.

BACKGROUND OF INVENTION

Wastewater FOG is produced, e.g., by meat fats in food scraps, cooking oil, lard, butter, gravy, and food products. Wastewater from food source and food service facilities such as restaurants, processing plants, factories, food courts and hotels are often referred to as "greywater". The terms "greywater", "wastewater" and "effluent" may be used substantially interchangeably herein.

When greywater passes through sewer systems, FOG accumulates inside the pipes, eventually restricting flow with the potential of causing untreated wastewater to back up into businesses and homes, resulting in high clean up and restoration costs and fines. When discharged into septic systems and drain fields, FOG can cause malfunctions, resulting in more frequent tank pump-outs and other expenses. Additionally, manholes can overflow into parks, yards, streets, and storm drains, allowing wastewater to contaminate local waters, including drinking water.

Exposure to untreated wastewater is a public-health hazard. Every year, communities spend significant sums unplugging or replacing grease-blocked pipes, repairing pump stations, and cleaning up costly and illegal wastewater spills. If a blockage can be attributed to a particular business, these communities may charge the business for the repair of the sewer pipes and the spill clean-up. In addition, communities often add a surcharge to wastewater bills if a business exceeds a specified discharge limit. These expenses can be significant.

In response, businesses attempt to reduce their FOG discharge through the use of, e.g., grease traps. However, it is typically not practical to pump grease traps on a continual basis. Even if a grease trap is pumped on a monthly or weekly basis, in that time, significant portions of the grease will break down and turn septic. Not only does the grease have an offensive smell, but it will sink and pass out of the grease trap adding to the BOD (Biochemical Oxygen Demand) and of COD (Chemical Oxygen Demand) at the local sewer plant or contaminate and foul sand mounds or fields of on-lot systems.

The Inventor desires a FOG collector which can be used to collect FOG from effluent.

SUMMARY OF THE INVENTION

In accordance with one aspect of the invention, there is provided a FOG collector which includes:

- at least one floating member which is configured operatively to float in an effluent containing zone;
- at least one heating arrangement configured to warm or heat effluent in the effluent containing zone, thereby liquifying, at least partially, FOG in the effluent; and
- a collecting arrangement configured to draw in at least some of the warmed effluent including the liquified FOG out of the effluent containing zone for further treatment, processing and/or separation.

The FOG collector may be configured to be at least partially immersed in the effluent, in use. The floating member may be, or may include, a substantially cylindrical float compartment located in an operatively upper region of the collector.

The FOG collector may be removably insertable into the effluent containing zone. The floating arrangement may be secured to a suspending arrangement by which the collector is operatively suspended in the effluent containing zone. The suspending arrangement may include a plurality of eyelets at a top of the FOG collector.

The heating arrangement may be configured to heat at least a surface layer of the effluent. The heating arrangement may include heating elements depending from the floating member. The heating elements may be electrical heating elements.

The effluent containing zone may be an underground zone. The effluent containing zone may be defined by a pump station, wet well, settlement tank, commercial grease trap or sewage treatment plant.

The collecting arrangement may be configured to suck or pump the FOG and water out of the effluent containing zone, e.g. to an above ground plant. The collecting arrangement may include one or more of a funnel, suction skimmer box, a flexible hose, an inlet pipe, and a pump for removing the effluent from the effluent containing zone.

The collecting arrangement may be configured to be coupled to a FOG treatment, processing and/or separation plant, such that the collecting arrangement operatively sucks or pumps FOG waste to the plant. An outlet of the hose or inlet pipe of the collecting arrangement may operatively be coupled to an inlet of the FOG plant.

The FOG collector may include a plurality of floating members and a plurality of heating arrangements arranged in a plurality of groups, wherein each group includes at least one of the floating members coupled to at least one of the heating arrangements.

The FOG collector may include a fluid inlet configured to direct fluid, which may be at least cleaner than the effluent, towards the collecting arrangement. The fluid inlet may be configured to receive warm fluid and direct the warm fluid around the collecting arrangement, thereby further to warm the effluent and liquify the FOG. The fluid inlet may be configured to direct the fluid around the collecting arrangement thereby to clean or flush the collecting arrangement.

The collecting arrangement may include a weir, skimmer, or overflow arrangement to draw in the liquified FOG from the effluent containing zone. The collecting arrangement may include a funnel having an upper lip, wherein the upper lip of the funnel serves as the weir or overflow arrangement and the funnel directs the liquified FOG towards an outlet.

The FOG collector may include at least one mechanical filter. The FOG collector may include a plurality of mechanical filters. The FOG collector may include at least two mechanical filters of different grades comprising a courser filter and a finer filter arranged sequentially. The FOG collector may include a mechanical filter in the form of an outer mesh enclosure around the at least one floating member, the at least one heating arrangement, and the collecting arrangement. The FOG collector may include an inner mechanical filter in the form of a mesh or perforated wall around the collecting arrangement.

The FOG collector may include a support arrangement to support the at least one floating member relative to the collecting arrangement. The support arrangement may be in the form of an adjustable bracket, thereby to adjust a spatial relationship of the at least one floating member relative to the collecting arrangement.

The at least one heating arrangement may be supported by, and project operatively downwardly from, the at least one floating member The invention extends to a FOG treatment system comprising:
 a reservoir defining an effluent containing zone; and
 the FOG collector as defined above provided in the reservoir in the effluent containing zone.

The FOG treatment system may include a FOG processor in fluid flow communication with the collecting arrangement.

The invention extends to a method of collecting FOG using the FOG collector as defined above, the method including:
 providing the FOG collector in the effluent containing zone, the at least one floating member causing the FOG collector to float;
 activating the at least one heating arrangement thereby to warm effluent in the effluent containing zone and to liquify, at least partially, FOG in the effluent; and
 drawing in the liquified FOG by the collecting arrangement out of the effluent containing zone for further treatment, processing and/or separation.

The collector may further include an effluent returning arrangement. The effluent returning arrangement may include a return pipe configured to discharge treated effluent from the FOG plant back into the effluent containing zone.

BRIEF DESCRIPTION OF THE DRAWINGS

The invention will now be further described, by way of example, with reference to the accompanying drawings.

In the drawings.

DETAILED DESCRIPTION OF EXAMPLE EMBODIMENT

The following description of an example embodiment of the invention is provided as an enabling teaching of the invention. Those skilled in the relevant art will recognise that changes can be made to the example embodiment described, while still attaining the beneficial results of the present invention. It will also be apparent that some of the desired benefits of the present invention can be attained by selecting some of the features of the example embodiment without utilising other features. Accordingly, those skilled in the art will recognise that modifications and adaptations to the example embodiment are possible and can even be desirable in certain circumstances and are a part of the present invention. Thus, the following description of the example embodiment is provided as illustrative of the principles of the present invention and not a limitation thereof.

Figure 1:
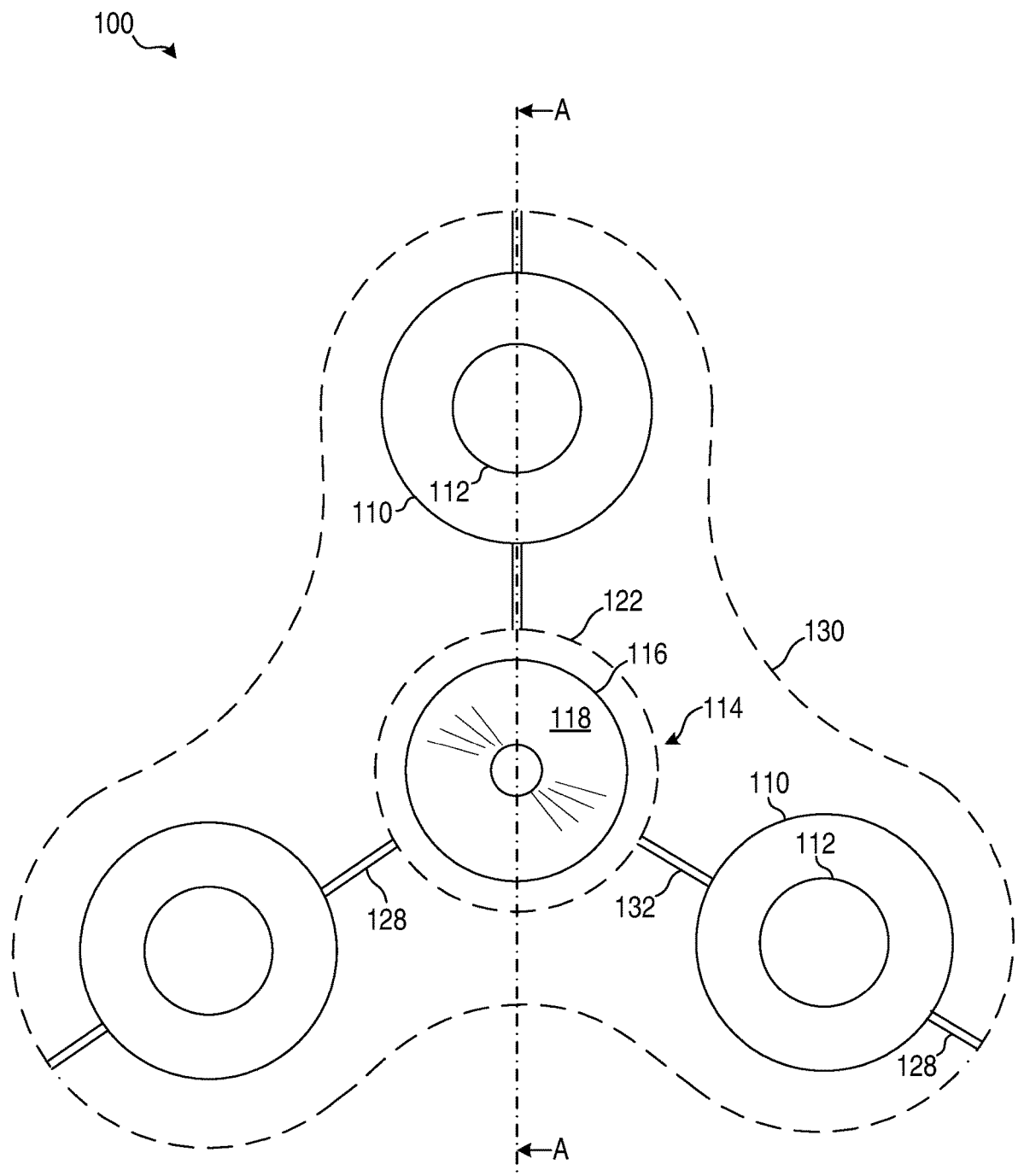
FIG. 1 illustrates a schematic plan view of a FOG collector, in accordance with the invention.
Figure 2:
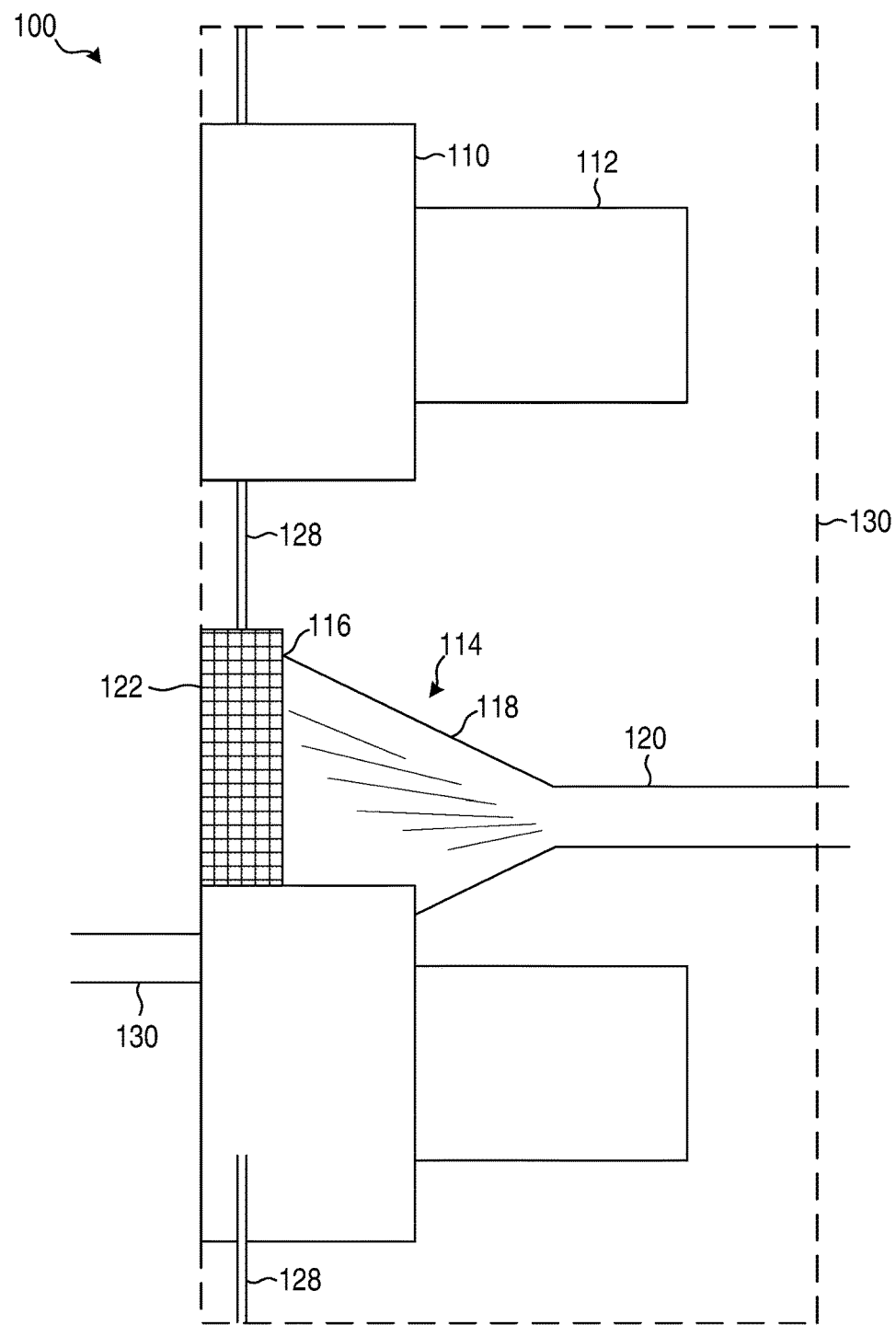
FIG. 2 illustrates a schematic side view of the FOG collector of FIG. 1.
Figure 3:
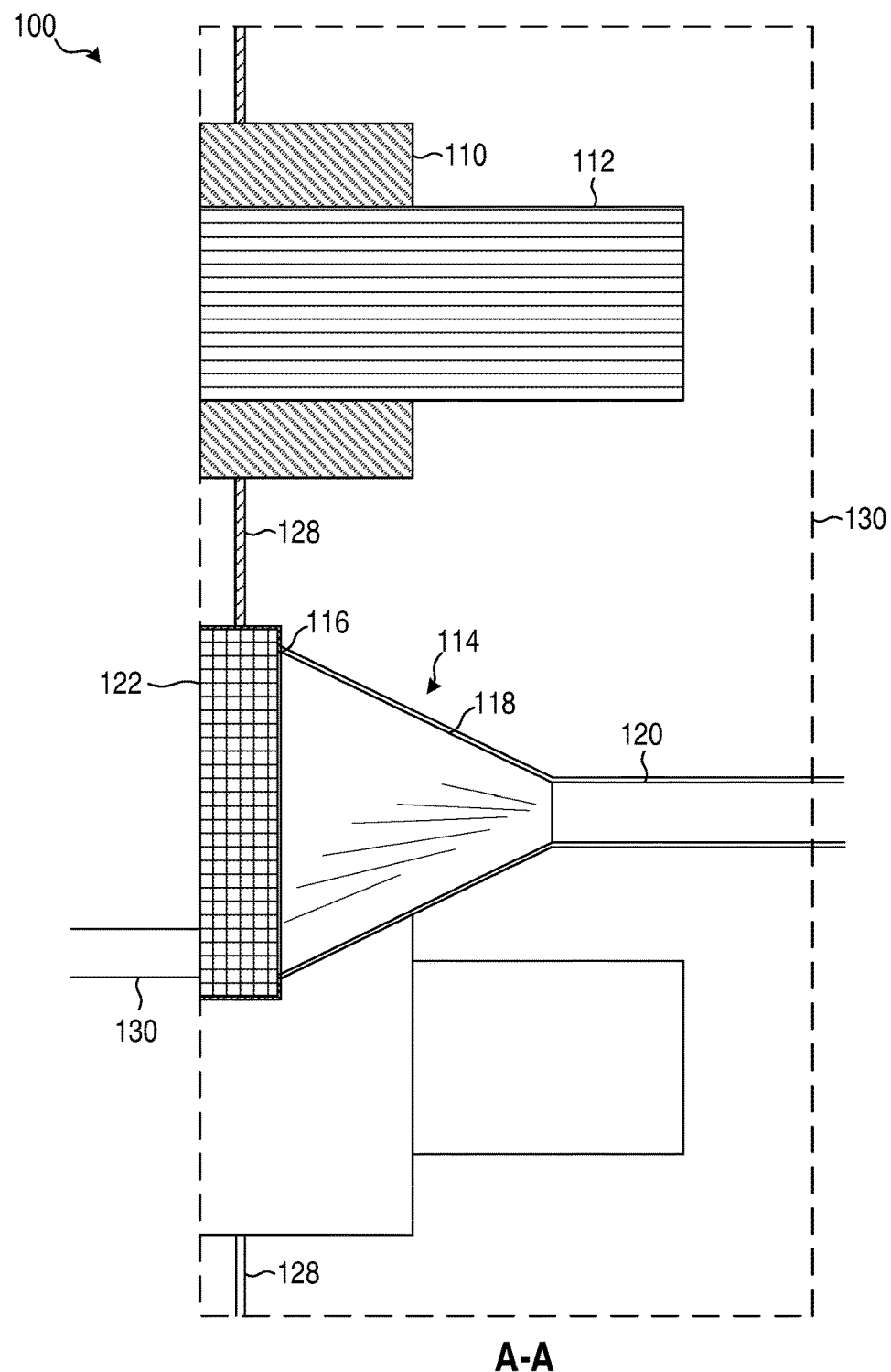
FIG. 3 illustrates a schematic sectional view of the FOG collector of FIG. 1 through plane A-A.

FIGS. 1-6 illustrate a first embodiment of a FOG collector 100 in accordance with the invention. FIGS. 1-3 illustrate the FOG collector 100 in isolation and will be used mainly to describe its structural features, while FIGS. 4-7 illustrate the FOG collector 100 in use and will be used to describe more functional aspects. FIGS. 8-16 illustrates a second embodiment of the FOG collector 100'. Like features in the embodiments 100, 100' are represented by the same references numerals either not having an apostrophe (e.g., 100) in the first embodiment or having an apostrophe (e.g., 100') in the second embodiment.

The FOG collector 100 has at least one floating member 110. In this example, the FOG collector 100 has three floating members 110 in the form of floats or buoyant elements. Each float 100 may be of a light material, e.g., polystyrene and/or of a hollow material, e.g., a sealed plastic enclosure filled with air. The floats 110 are less dense than effluent in which they are intended to float and, not only do they float in the effluent, but they support the remainder of the components of the FOG collector 100.

The specific number and configuration of the floats 110 may be a design choice. In this example, there are three floats 100, but there could be more or less. Instead of discrete floats 100, there could be larger or connected floats, e.g., one large annular float.

The FOG collector 100 has at least one heating arrangement 112 configured to warm the effluent, thereby liquifying, at least partially, FOG in the effluent. In this example, the heating arrangement 100 comprises three discrete heaters 112, with each heater 112 associated with a float. Again, the number and configuration of the heaters 112 may be a question of design preference. Each float 110 surrounds an associated heater 112 (see FIG. 1) like an annular sleeve while each heating element 112 projects downwardly from the float (see FIGS. 2-3) to have direct contact with the effluent, in use. The floats 110 and heaters 112 are arranged in pairs.

In this configuration, the heaters 112 do not need to boil or heat the effluent significantly. The heaters 112 are configured to heat or merely warm the effluent to a temperature of about 40-50 °C. This temperature may vary depending on a specific type or composition of the FOG to be collected but such medium temperatures are usually sufficient to liquify most types of FOG. The heaters 112 may include electrical resistive elements powered by electricity to produce the heat.

The FOG collector 100 has a collecting arrangement 114 configured to draw in at least some of the warmed effluent including the liquified FOG. In this example, the collecting arrangement 114 is in the form of a funnel 114 (and further referred to as such). The funnel 114 has a conical or frustoconical body 118 which tapers operatively downwardly. The funnel 114 has an upper lip 116 at its upper end which serves as a weir or overflow permitting a top layer of the effluent (which is usually predominantly liquified FOG) to flow over the lip 116 into the body 118 of the funnel 114, the effluent then being channelled by the funnel 114 to an outlet.

A mesh wall or sieve 122 is provided around the rim 116 of the funnel 114. The mesh wall 122 is annular and serves as a screen or sieve for effluent overflowing the weir provided by the rim 116 (further described below). The mesh wall 122 may thus serve as a mechanical filter.

The FOG collector 100 has a mesh enclosure 130 surrounding and enclosing most of the other components including the floats 110, the heaters 112, and the funnel 114. A shape of the mesh enclosure may be a design choice. In this example, given that there are three float and heater pairs 110, 112, the mesh enclosure 130 is a tri-lobed shape to accommodate the other components in a fairly material-efficient manner while providing good surface area and exposure of the funnel 114 to surrounding effluent.

A support arrangement in the form of a bracket or frame 128 is provided to locate and support the various components relative to each other. Elements of the frame 128 radiate outwardly from the funnel 114, to the float/heater pairs 110, 112 and to the mesh enclosure 130. The bracket 128 may be adjustable, e.g., to adjust a spacing of the float/heater pairs 110, 112 relative to the funnel 114. Also, the frame 128 may permit dismantling of the FOG collector 100 for maintenance, cleaning, repair, etc. or for the interchange of components, e.g., to install a higher capacity heater.

The mesh enclosure 130 may have a courser grade than that of the mesh wall 122. Accordingly, the FOG collector 100 may provide various grades or levels of screening, thereby to maximise FOG collection and minimise blockage by solids or other detritus. The mesh enclosure 130 and/or the mesh wall 122 may thus serve as mechanical filters.

The FOG collector 100 has an inlet 160 (not illustrated in FIG. 1, for ease of illustration) which can be used for receiving flushing liquid. This is described in further detail in FIG. 4-7.

Figure 4:
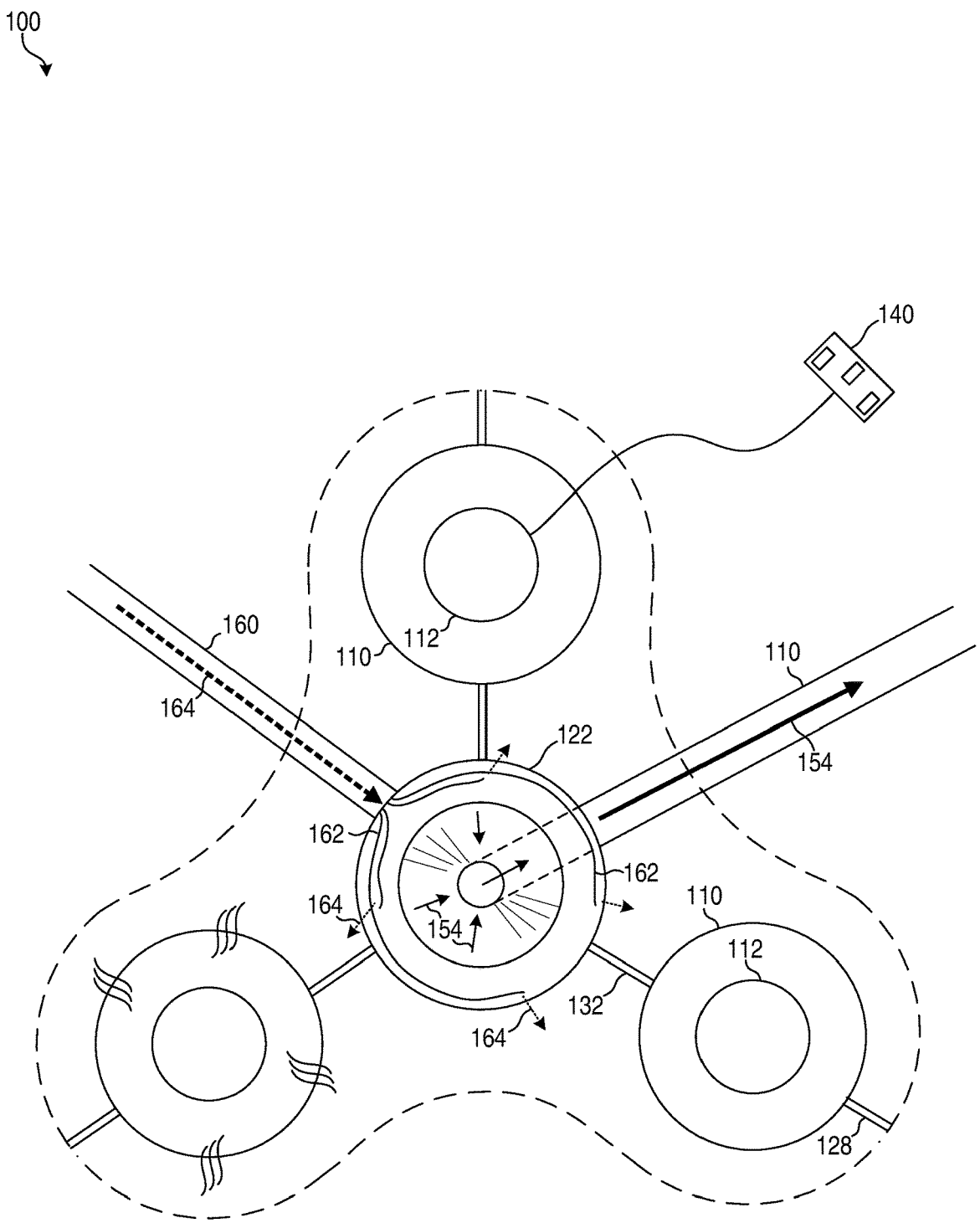
FIG. 4 illustrates a schematic plan view of the FOG collector of FIG. 1 in use.
Figure 5:
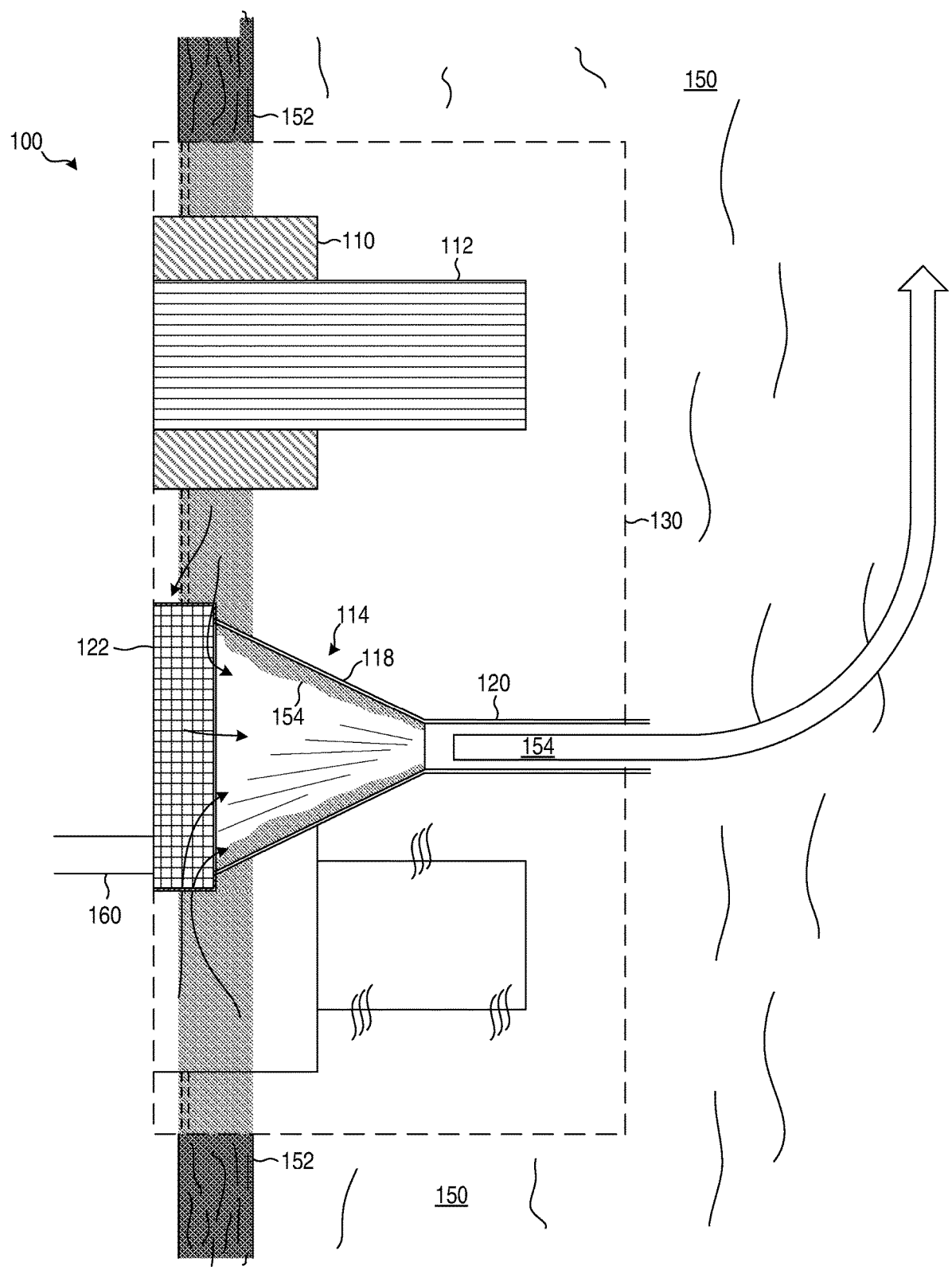
FIG. 5 illustrates a schematic sectional view of the FOG collector of FIG. 3 in use.
Figure 6:
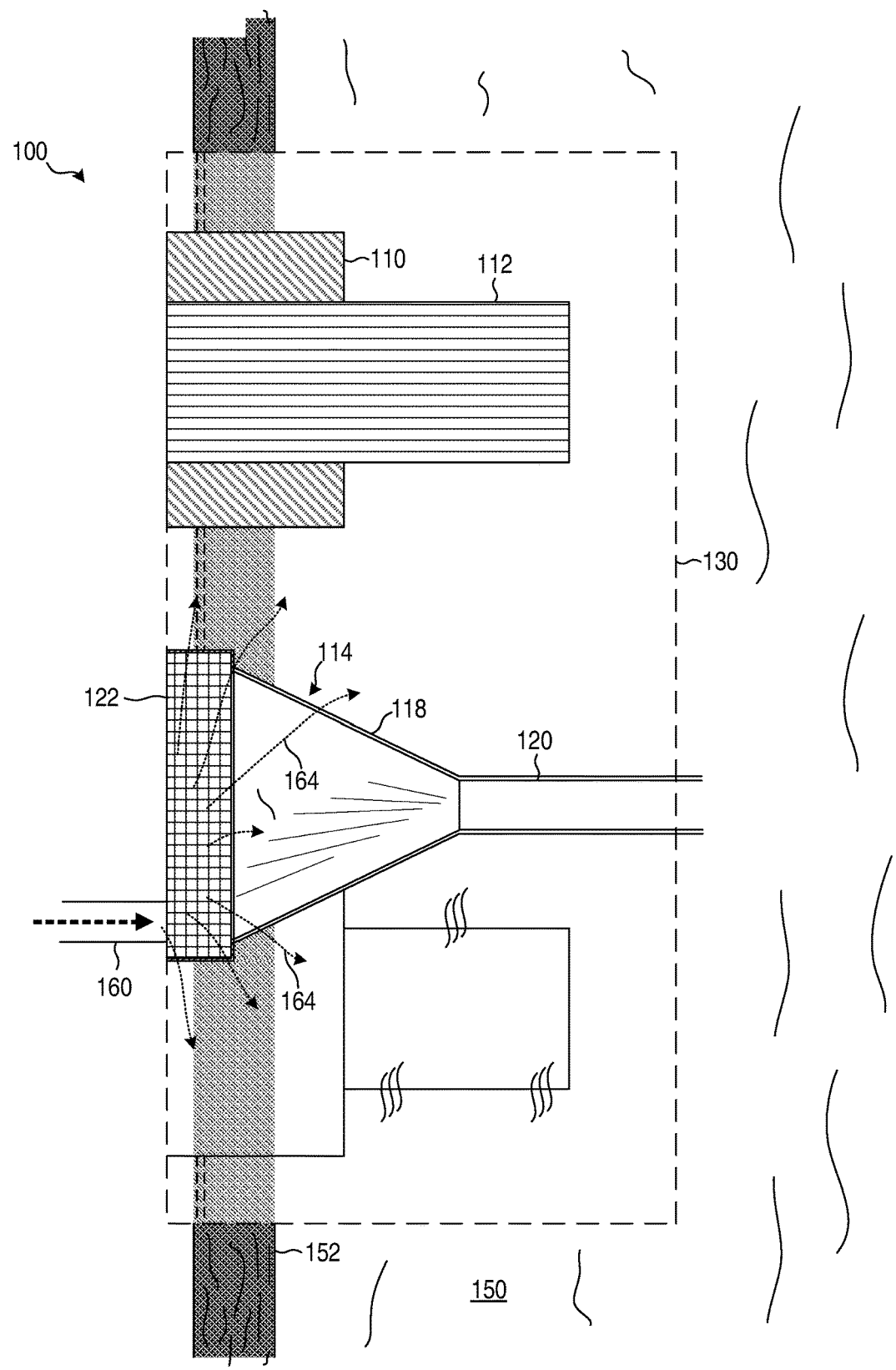
FIG. 6 illustrates another schematic sectional view of the FOG collector of FIG. 5 in use.
Figure 7:
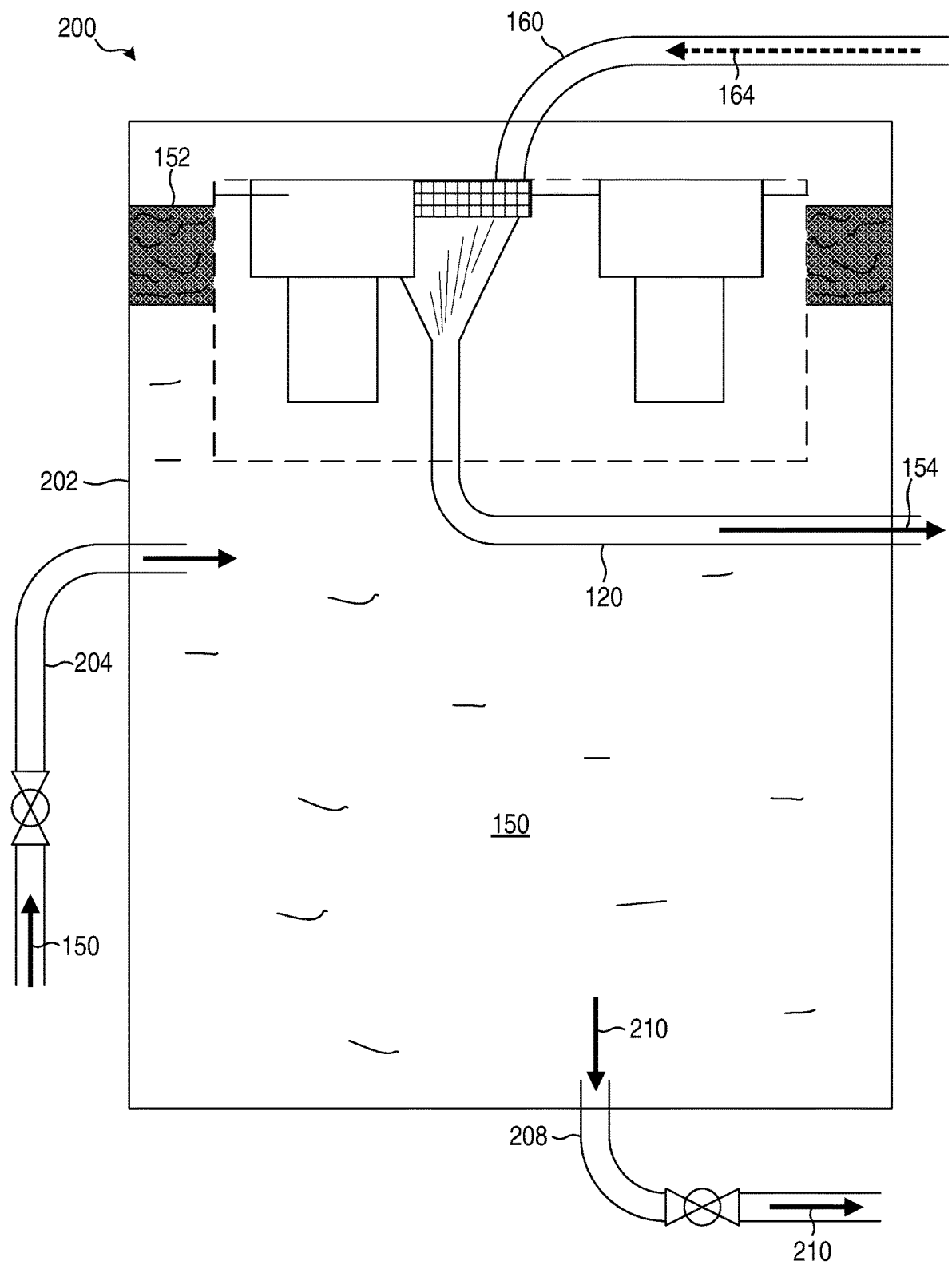
FIG. 7 illustrates a schematic side view of the FOG collector of FIG. 1 provided in an effluent reservoir.
Figure 8:
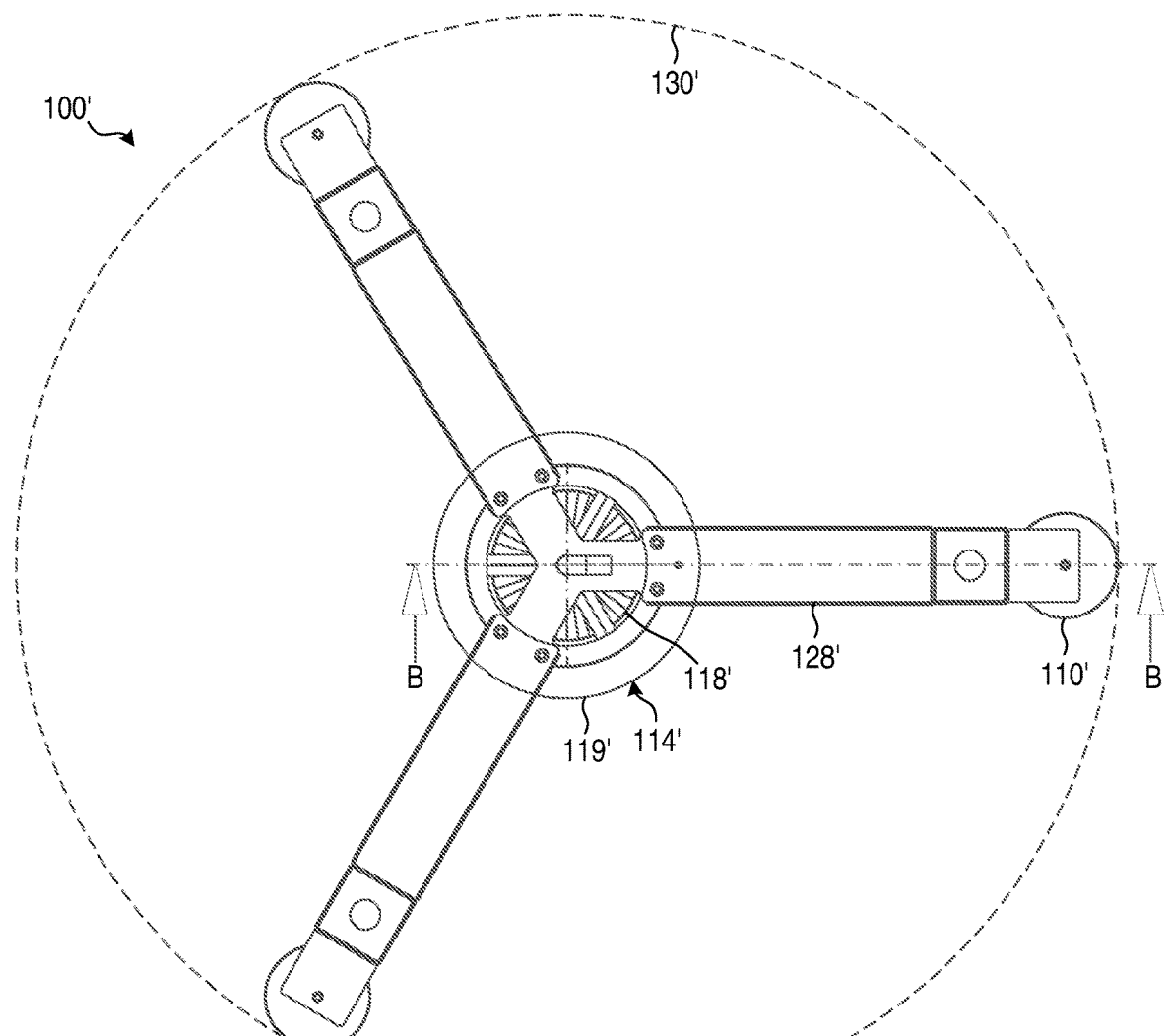
FIG. 8 illustrates a more technical plan view of a second embodiment of a FOG collector, in accordance with the invention.
Figure 9:
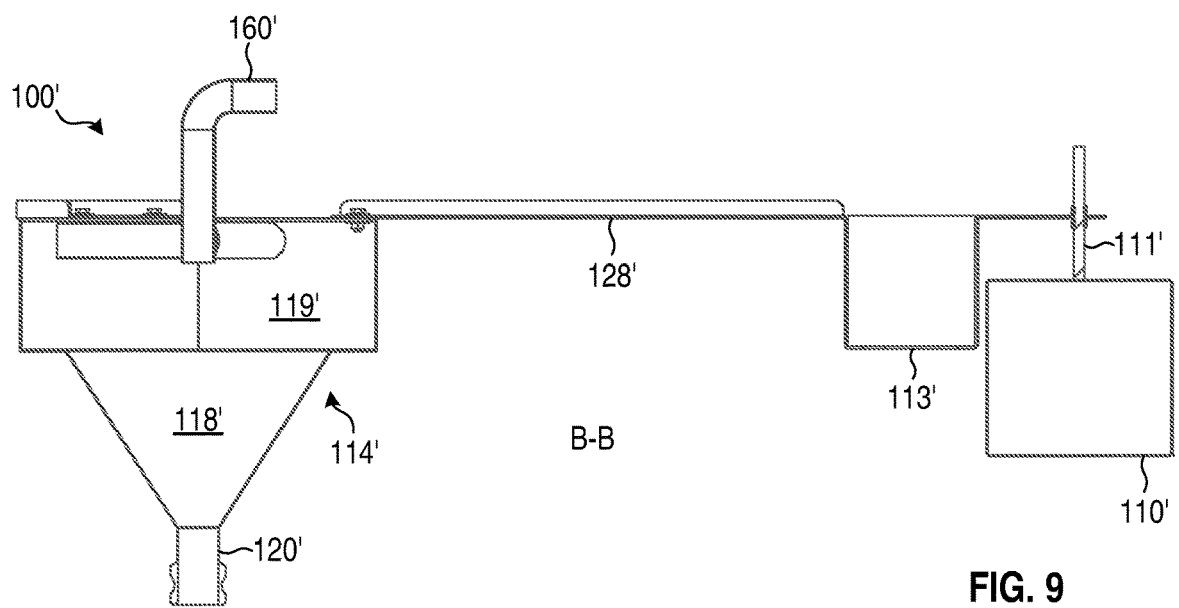
FIG. 9 illustrates a sectional view of the FOG collector of FIG. 8 through plane B-B.
Figure 10:
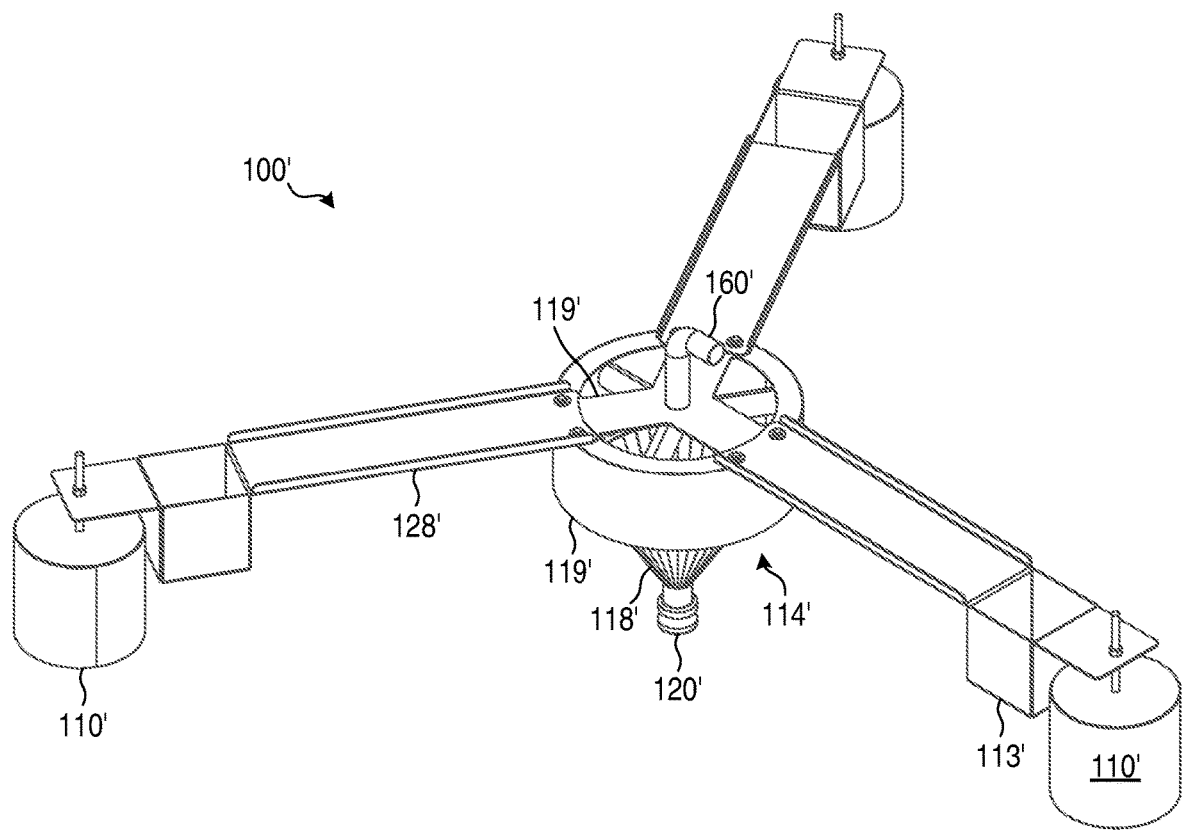
FIG. 10 illustrates a three-dimensional view of the FOG collector of FIG. 8.
Figure 11:
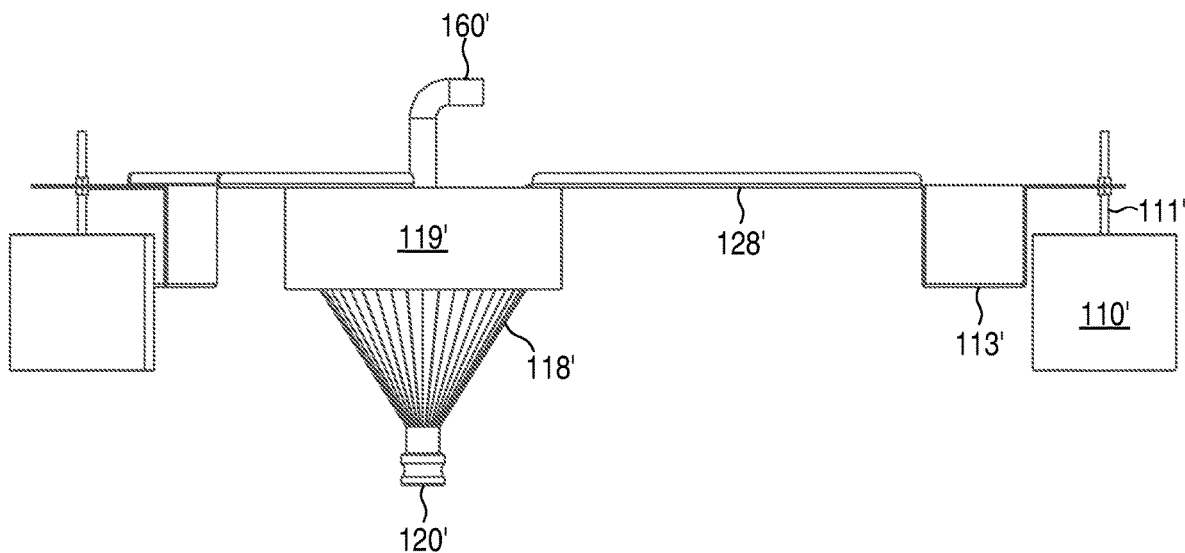
FIG. 11 illustrates a side view of the FOG collector of FIG. 8.

FIGS. 4-6 illustrate the FOG collector 100 in use and FIG. 7 illustrates a FOG system 200 incorporating the FOG collector 100. The FOG collector 100 is intended to be placed in an effluent containing zone. The effluent containing zone may be a storage cavity of a large storage tank or reservoir 202 as illustrated in FIG. 7. In an alternate embodiment, the effluent containing zone may be in inner area of a grease trap; in other words, the FOG collector 100 may be configured to be placed directly at a site of effluent and FOG generation.

The effluent containing zone contains, in use, general effluent 150 including a proportion of FOG 152. The effluent may be generated from domestic or industrial processes. The effluent may be generated by food preparation, waste treatment, etc. Regardless of the source of the effluent, it contains some proportion of FOG 152. The remainder of the effluent may be predominantly water (e.g., grey- or brown water) and may include solid or particulate detritus not being FOG. The FOG 152 is generally less dense than water and therefore tends to float in the effluent 150. It is this principle that is leveraged by the present invention. (Although illustrated as a relatively thin layer atop the effluent 150, the FOG 152 may in fact comprise a majority of the effluent 150, at least initially. The better the pre-screening of the effluent 150, the more FOG 152 will be in the effluent 150.)

When the FOG collector 100 is placed in the effluent containing zone, it tends to float due to the presence, and action, of the floats 112. The FOG collector 100 may be configured to be slightly more than neutrally buoyant, so that it floats in the effluent, but does not project much out of the surface thereof.

Usually, at room temperature, FOG is solid or a highly viscous liquid. It may not have a sufficient degree of flowability to cooperate with a weir. Accordingly, the heaters 112 are energised. The FOG collector 100 includes an electrical system, illustrated in FIG. 4 as a plug and cord combination 140, connected to the heaters 112. Accordingly, electrical power is delivered to the heaters 112 and they begin to warm up, and to warm the surrounding effluent 150. The electrical system may include a thermostat to control the heaters 112 such that the effluent 150 is heated to, and then maintained at, 40-50° C. As the FOG collector 100 is intended to serve, at least partially, an environmentally friendly function, some or all of the electrical input power may be derived from solar panels. Heat waves are illustrated schematically radiating from one of the heaters 112 in FIGS. 4-6.

As the effluent 150 warms up, the FOG 152 liquifies. It may still be a relatively viscous fluid compared to water but becomes sufficiently flowable to cooperate with a weir and to flow there-over. The liquified FOG 152 may then flow relatively freely through the mesh enclosure 130. Courser particulate detritus is screened out by the mesh enclosure 130, permitting only FOG 152 and finer particulate detritus therethrough.

The liquified FOG 152 may then flow through the finer mesh wall 122. The mesh wall 122 serves to filter out finer particulate detritus to an acceptable degree, so that only FOG 152 and tiny particulate detritus can flow over the rim 116 of the funnel 114. The buoyancy of the FOG collector 100 is configured such that the rim 116 of the funnel 114 is below a surface of the effluent 150, but above a lower boundary of the FOG 152. In other words, the rim 118 is provided in a FOG layer.

This permits the overflow action to draw off the FOG 152 only, or at least predominantly, and to leave the remainder of the effluent 150 in the effluent containing zone. The overflowed FOG 154 (see FIG. 5) is then directed downwardly, by gravity, by the conical body 116 of the funnel 114 and through an outlet in the form of an outlet conduit or pipe 120. The solid arrows in FIG. 4 also illustrate this process. Additional pumping means could be provided, if desired. The outlet conduit 120 may direct the FOG to a FOG processing or treatment apparatus.

Another useful feature of the FOG collector 100 is the provision of an in-collector inlet comprising a fluid inlet pipe or conduit 160. "Inlet" in this context is relative to the FOG collector 100 as a whole meaning that it is configured to deliver a supply of fluid into the FOG collector 100. The inlet pipe 160 may terminate in an arrangement of ducting or nozzles 162 provided within the mesh wall 122 and directed outwardly towards the mesh wall 122. The inlet pipe 160 may deliver a flushing liquid 164 towards the mesh wall 122 to dislodge or flush any detritus stuck to an outer surface of the mesh wall 122.

Depending on a quantity of flushing liquid 164 provided, the flushing liquid 164 may also be propelled out of the FOG collector 100 through the mesh enclosure 130, thereby also to flush any detritus stuck to an outer surface of the mesh enclosure 130. The flushing liquid 164 would then form part of the effluent 150. The flushing liquid 164 could be clean water but need not be. The flushing liquid 164 should be cleaner than the general effluent 150 to be effective, but may be brown or greywater, even wastewater extracted as part of a process upstream or downstream from the FOG collector 100.

The provision of the flushing liquid 164 may be periodic. It may be provided cyclically at timed intervals, e.g., every 10 minutes or every hour. Instead, it may be provided in response to an event like a degree of blockage of the mesh wall 122 or mesh enclosure 130 or in response to a flow rate of the overflowed FOG 154 dropping below a certain threshold.

The flushing liquid 164 may be warm, e.g., a similar temperature to that maintained by the heaters 112. This may assist in warming the effluent 150 and reduce power usage by the heaters 112. Some of the flushing liquid 164 may inadvertently fall into the funnel 114 and be channelled via the outlet conduit 120, but this is acceptable.

FIG. 7 illustrates the FOG system 200 incorporating the FOG collector 100. The reservoir 200 has an effluent inlet pipe 204 configured to fill the effluent containing zone within the reservoir 202 with effluent. Preferably, the effluent 150 has been pre-screened to remove large particulate detritus. Accordingly, the FOG system 200 may provide three levels of mechanical filtration: (1) a pre-screening stage for filtering large particulate detritus, (2) the mesh enclosure 130 for filtering medium particulate detritus, and (3) the mesh wall 122 for filtering fine particulate detritus. The effluent inlet pipe 204 may be situated in the middle of the reservoir or sump 202 or enter in the top above the floating FOG collector 100. It may depend on the level in the reservoir 202 when it comes to filling it.

Optionally, but usefully, the effluent may be "pressed" to remove excess water prior to delivery into the reservoir 202. The Applicant is aware of screw systems (e.g., using an Archimedes screw) to press effluent to squeeze out as much water as practicable. Such a system may be employed upstream of the inlet pipe 204 to maximise an amount of FOG 152 in the effluent 150.

The reservoir 200 may include a drainage outlet 208 for draining remaining effluent 210 from which the FOG 152 has been removed. This remaining effluent 210 may be predominantly water (e.g., FOG-free greywater). The drainage outlet 208 may conduct the remaining effluent 210 to wastewater treatment works, to greywater irrigation systems, or to a biofuel plant.

Wastewater which drained from base of an artificial sump or grease trap may consist of bio organic waste particles. When the effluent 150 is introduced into the reservoir 202, it will consist of FOG 152 and suspended organic solids particles. The FOG 152 and these particles may float initially. Once the FOG 152 has heated and it and water are drawn through the mesh enclosure 130, to be cycled through the system, it separates from these small organic solids and they then settle to the bottom of the reservoir 202. When the reservoir 202 is drained, the organic solids may be separated from the water, using a screen or Archimedes drive. The screened and dewatered organic solids can then be used as feedstock for biogas production or composted.

An advancement to the system 200 is to add a cylindrical weir inside the sump 202 or use a cylindrical based sump (conical tank); this may channel all of the organic waste particles to the base of the sump 202. The drainage outlet 208 may be provided at a bottom of the sump 202 and, when opening the drainage outlet 208, the water pressure may "pump" out the settled organic waste first, flushing the system 200. This can be automated by including a solenoid valve in the drainage outlet 208.

The outlet pipe 120 may conduct the liquified or drained FOG 154 to a FOG processing or treatment apparatus (not illustrated). The inlet pipe 160 may provide flushing liquid obtained from the FOG processing or treatment apparatus. Accordingly, although specifics of any connected FOG processing or treatment apparatus are outside the scope of this specification, the FOG collector 100 may be configured to be connected to the FOG processing or treatment apparatus in a circular loop such that the FOG collector 100 delivers FOG 154 to the FOG processing or treatment apparatus and receives flushing liquid 164 back therefrom.

Referring now to FIGS. 8-16, a second embodiment of the FOG collector 100' is illustrated. Conceptually, this second embodiment is the same as the first, but it is implemented with structural differences. For example, the floats 110' are spaced further away from the collecting arrangement 114'. The floats 110' are mounted on upright support axles 111' and are height-adjustable to configure a height that the collecting arrangement 114' floats relative to a surface level of the effluent 150.

The arms of the frame 128' are more developed and longer. The heaters are not illustrated but operatively would be accommodated within compartments or buckets 113' provided on each arm of the frame 128' just radially inwardly of the floats 110'. The outlet pipe 120' is illustrated more as an output coupler 120' to which an external hose (not illustrated) can be connected.

A more significant structural difference in the second embodiment of the FOG collector 100' is the configuration of the collecting arrangement 114'. While the collecting arrangement 114' is still generally in the form of a funnel, it does not have a mesh wall 122 as in the first embodiment of the FOG collector 100. Instead, it has a cover arrangement 119' which comprises a cylindrical skirt and an annular top piece with three spokes. A perforated or mesh rim extension 122' (best seen in FIG. 16) is provided concentrically around the funnel body 118' and is coupled to the funnel rim 116'. The cover arrangement 119' is provided on top of the funnel body 118' and rim extension 122' such that the skirt depends downwardly over the funnel body 118'.

Figure 12:
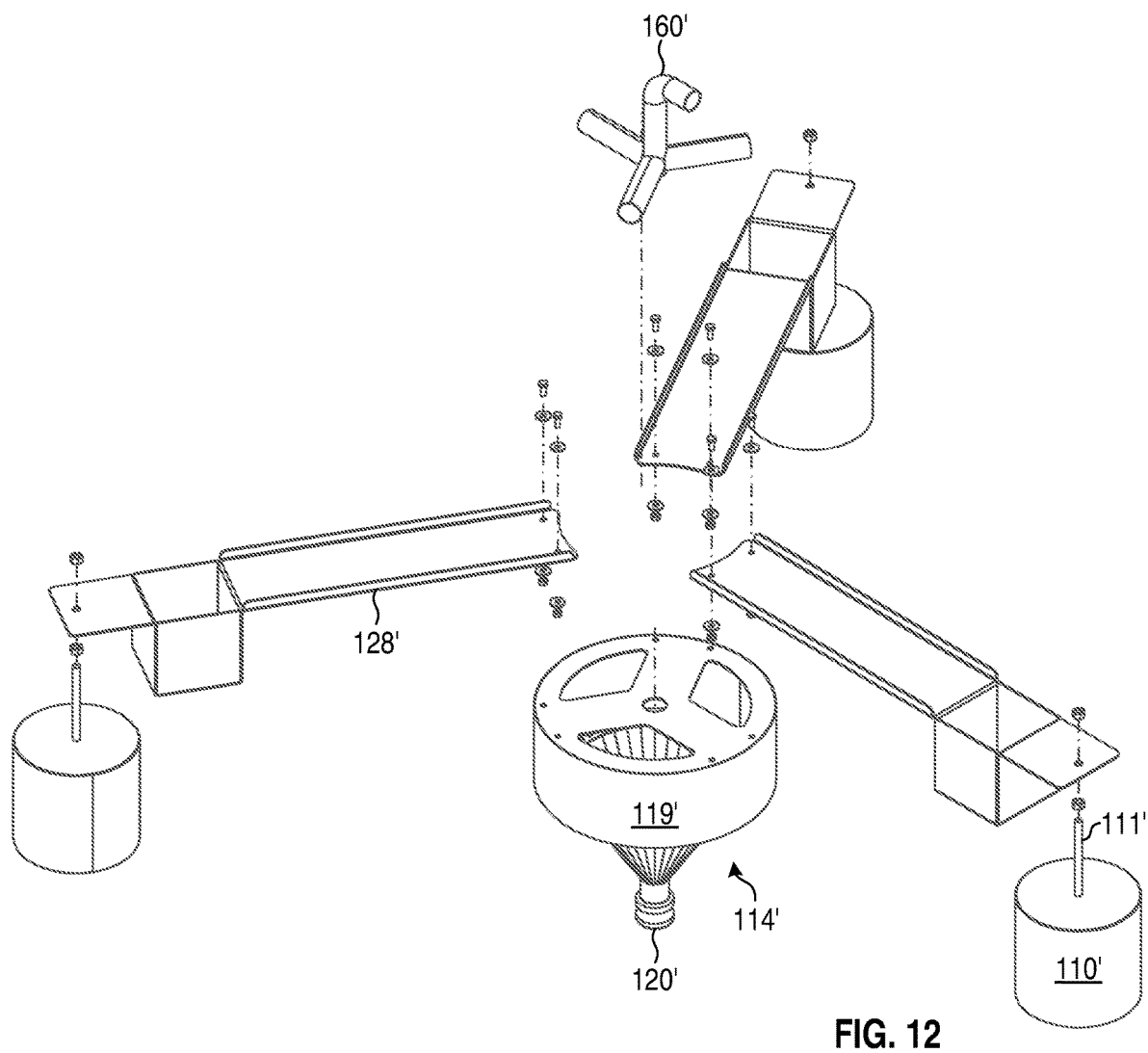
FIG. 12 illustrates a three-dimensional exploded view of the FOG collector of FIG. 8.
Figure 13:
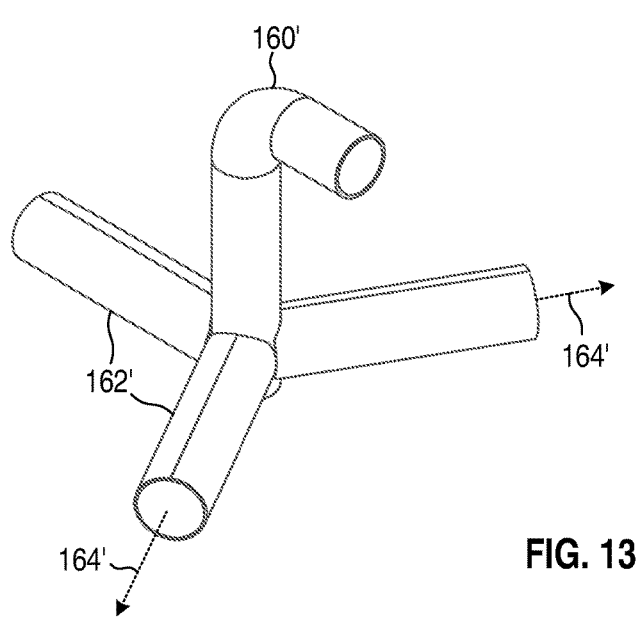
FIG. 13 illustrates an enlarged view of an inlet pipe of the FOG collector of FIG. 8.
Figure 14:
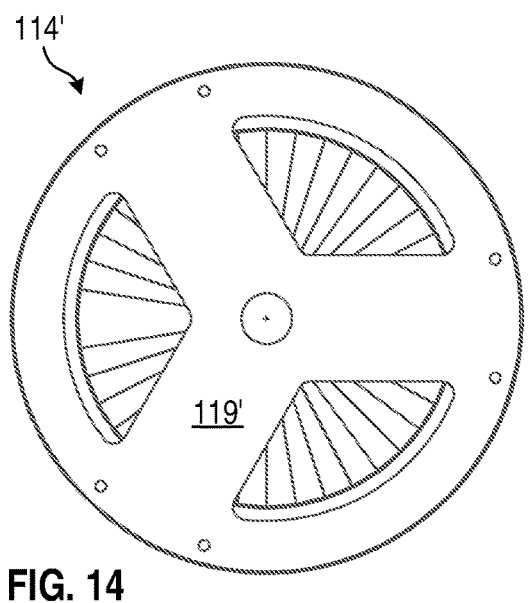
FIG. 14 illustrates a plan view of a collecting arrangement of the FOG collector of FIG. 8.
Figure 15:
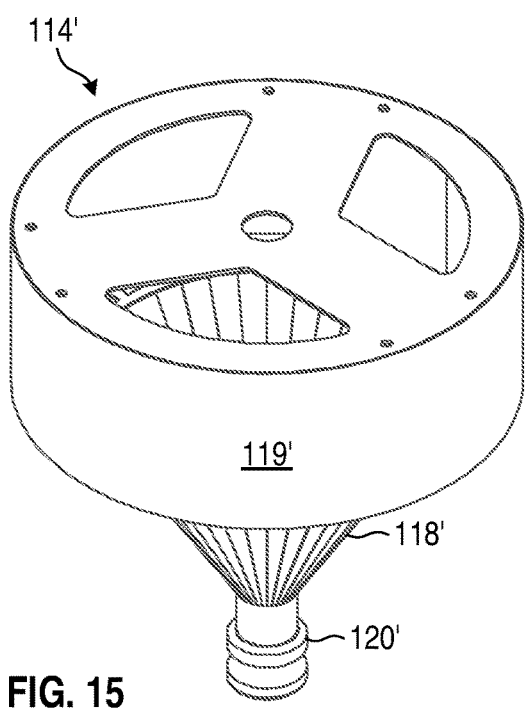
FIG. 15 illustrates a three-dimensional view of the collecting arrangement of FIG. 14.
Figure 16:
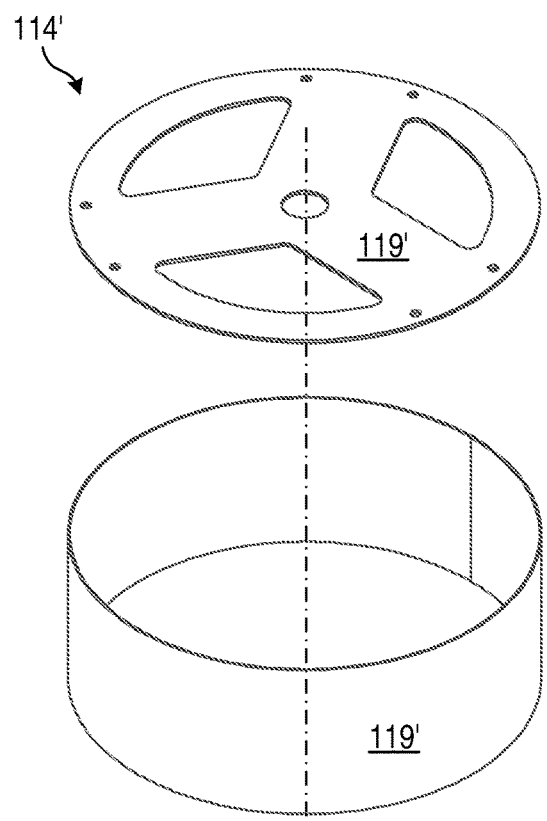
FIG. 16 illustrates an exploded view of the collecting arrangement of FIG. 14.
Figure 16:
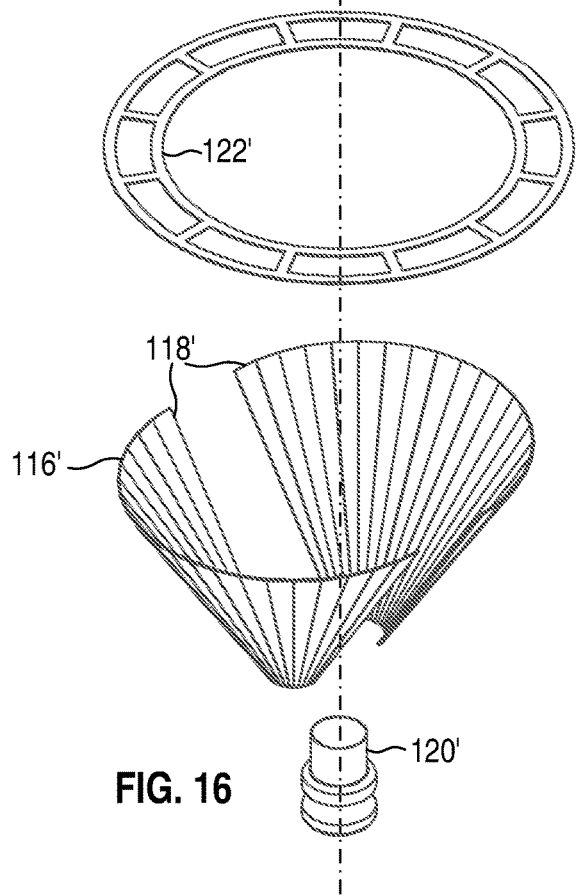

Also, in this second embodiment, the inlet pipe 160' is slightly differently configured and can be seen more clearly, particularly in FIGS. 12-13. It comprises a central inlet pipe 160' having three nozzles or branches 162' directed radially outwardly. The inlet pipe 160' is accommodated within a matched aperture provided in the cover arrangement 119' and is held securely in place by the cover arrangement 119'. The nozzles 162' are directed outwardly towards the skirt of the cover arrangement 119' which directs the flushing liquid 164' towards the rim extension 122', thereby to flush away detritus.

An aspect which should be emphasised is the medium temperature (in the region of 40-50° C., but thus could be increased or decreased moderately depending on the specific composition of the FOG being handled) at which the FOG collector 100, 100' is configured to operate. This makes the FOG collector 100, 100' energy efficient; this is enhanced by the fact that the FOG collector 100, 100' is configured to float (as a floating head) in that the heat delivered by the heaters 112 is delivered to a top of the effluent 150.

Accordingly, the Applicant has found in technical trials that the FOG collector 100, 100' does not actually heat the entire volume of the effluent 150 but merely the upper levels, or at least more so the upper levels, where the FOG 152 is situated, due to the location of the FOG collector 100, 100' and the rising action of heat. Bottom levels of the effluent 150 may be cooler, e.g., 30-40° C. or even room temperature. In other words, there may be a temperature gradient which forms in the effluent 150, increasing from the bottom of the effluent 150 to the FOG 152 at the top.

This is even further enhanced by the introduction—or re-introduction, if the system 200 is configured circuitously—of warmed flushing liquid 164, 164' which may also be in the temperature range of 40-50° C.

The Applicant believes that the invention, as exemplified, provides a useful FOG collector 100, 100' that has a number of benefits:

It is relatively low maintenance in that it has few or no moving parts.

It is a self-floating arrangement and can be thought of as a floating head.

It is versatile in that it can be placed in generic effluent reservoirs or in existing grease traps.

It is relatively energy efficient in that it only needs to warm the effluent 150 to a medium temperature of about 40-50° C. and not near boiling temperature (e.g., 70-100° C.). This lowers both started and steady-state energy needs for heating.

The inlet pipe 160 permits flushing which reduces maintenance and cleaning requirements, lowering downtime.

The outlet pipe 120, 120' and the inlet pipe 160, 160' may be connected to the same FOG processing or treatment apparatus, creating a circular or recursive system, further increasing efficiency.

The invention claimed is:

1. A Fats, Oil, and Grease (FOG) treatment system, comprising:
    a reservoir defining an effluent containing zone; and
    a FOG collector provided in the reservoir in the effluent containing zone, the FOG collector comprising:
        a plurality of floating members which are configured operatively to float in the effluent containing zone;
        a plurality of heaters configured to warm effluent in the effluent containing zone, thereby liquifying, at least partially, FOG in the effluent, wherein the plurality of floating members and the plurality of heaters are arranged in a plurality of groups, each group including at least one of the floating members coupled to at least one of the heaters;
        a collecting arrangement configured to draw in at least some of warmed effluent including liquified FOG out of the effluent containing zone for further treatment, processing and/or separation, wherein the collecting arrangement includes a weir or overflow arrangement to draw in the liquified FOG from the effluent containing zone; and
        a fluid inlet configured to direct fluid towards the collecting arrangement, wherein the fluid inlet is configured to receive warm fluid and direct the warm fluid around the collecting arrangement, wherein the fluid inlet terminates in an arrangement of ducting or nozzles provided within the collecting arrangement and directed outwardly towards the weir or overflow arrangement, thereby simultaneously to warm the effluent and liquify the FOG further and to clean or flush the collecting arrangement.

2. The FOG treatment system as claimed in claim 1, wherein the FOG treatment system comprises a FOG processor in fluid flow communication with the collecting arrangement.

3. The FOG treatment system as claimed in claim 1, wherein the collecting arrangement comprises a funnel having an upper lip, and wherein the upper lip of the funnel serves as the weir or overflow arrangement and the funnel directs the liquified FOG towards an outlet.

4. The FOG treatment system as claimed in claim 1, wherein the FOG treatment system comprises at least one mechanical filter.

5. The FOG treatment system as claimed in claim 4, wherein the FOG treatment system comprises a plurality of mechanical filters.

6. The FOG treatment system as claimed in claim 5, wherein the FOG treatment system comprises at least two mechanical filters of different grades comprising a courser filter and a finer filter arranged sequentially.

7. The FOG treatment system as claimed in claim 4, wherein the FOG treatment system comprises a mechanical filter in a form of an outer mesh enclosure around the plurality of floating members, the plurality of heaters, and the collecting arrangement.

8. The FOG treatment system as claimed in claim 4, wherein the FOG treatment system comprises an inner mechanical filter in a form of a mesh or perforated wall or rim around the collecting arrangement.

9. The FOG treatment system as claimed in claim 1, wherein the FOG treatment system comprises a support arrangement to support the plurality of floating members relative to the collecting arrangement.

10. The FOG treatment system as claimed in claim 9, wherein the support arrangement is in a form of an adjustable bracket, thereby to adjust a spatial relationship of the plurality of floating members relative to the collecting arrangement.

11. The FOG treatment system as claimed in claim 1, wherein, in each group, a heater is supported by, and projects operatively downwardly from, a floating member.

12. The FOG treatment system as claimed in claim 1, wherein the FOG treatment system comprises no moving parts.

13. A method of collecting Fats, Oil, and Grease (FOG) using the FOG treatment system as claimed in claim 1, the method comprising:
    providing the FOG collector in the effluent containing zone, the at least one floating member causing the FOG collector to float;
    activating the at least one heater thereby to warm effluent in the effluent containing zone and to liquify, at least partially, FOG in the effluent; and
    drawing in the liquified FOG by the collecting arrangement out of the effluent containing zone for further treatment, processing and/or separation.

* * * * *